United States Patent [19]

Dietz et al.

[11] Patent Number: 4,473,010

[45] Date of Patent: Sep. 25, 1984

[54] SENSOR TRAVERSING DEVICE

[75] Inventors: Keith A. Dietz, Dallas; Michael J. Dobie, Lewisville, both of Tex.

[73] Assignee: Stewart Engineering and Equipment Co., Inc., Plano, Tex.

[21] Appl. No.: 327,465

[22] Filed: Dec. 4, 1981

[51] Int. Cl.³ .............................................. B61B 13/00
[52] U.S. Cl. ................................ 104/172 R; 198/460; 254/387
[58] Field of Search ............... 104/107, 109, 118, 119, 104/165, 172 R, 173 R, 176, 178; 254/387; 198/460; 212/71, 76, 87, 94, 215

[56] References Cited

U.S. PATENT DOCUMENTS

| | | | |
|---|---|---|---|
| 1,181,171 | 5/1916 | Sawyer | 212/94 X |
| 2,987,162 | 6/1961 | Griffin | 198/468 |
| 3,485,339 | 12/1969 | Miller et al. | 198/460 |
| 3,515,254 | 6/1970 | Gary | 198/502 |
| 3,566,801 | 3/1971 | Ashurst | 104/173 R |
| 3,575,300 | 4/1971 | Durand | 212/76 X |
| 3,613,867 | 10/1971 | Kroeger | 104/173 R X |
| 3,774,748 | 11/1973 | Dederer et al. | 198/444 |
| 3,822,009 | 7/1974 | Richards | 198/444 |
| 4,069,766 | 1/1978 | Bernstein | 104/173 R |

Primary Examiner—Randolph Reese
Attorney, Agent, or Firm—Michael A. O'Neil

[57] ABSTRACT

A grouping system (10) includes parallel conveyor belts (28) for conveying the objects from the unloader system (14) to the oven-ready conveyor (24). A group end sensor (64) is moveable along the grouping system (10) between the conveyor belts (28). The sensor includes both forward and rearward sensors (128, 130) for sensing the proximity of pans at a predetermined separation in the direction of travel. The group end sensor moves forward until its forward limit is reached or the forward sensor senses an object representing the last stopped pan. The conveyor then moves at full speed until the rearward sensor senses the following pan. The conveyor speed is then reduced so that the pan contact does not damage the dough.

9 Claims, 15 Drawing Figures

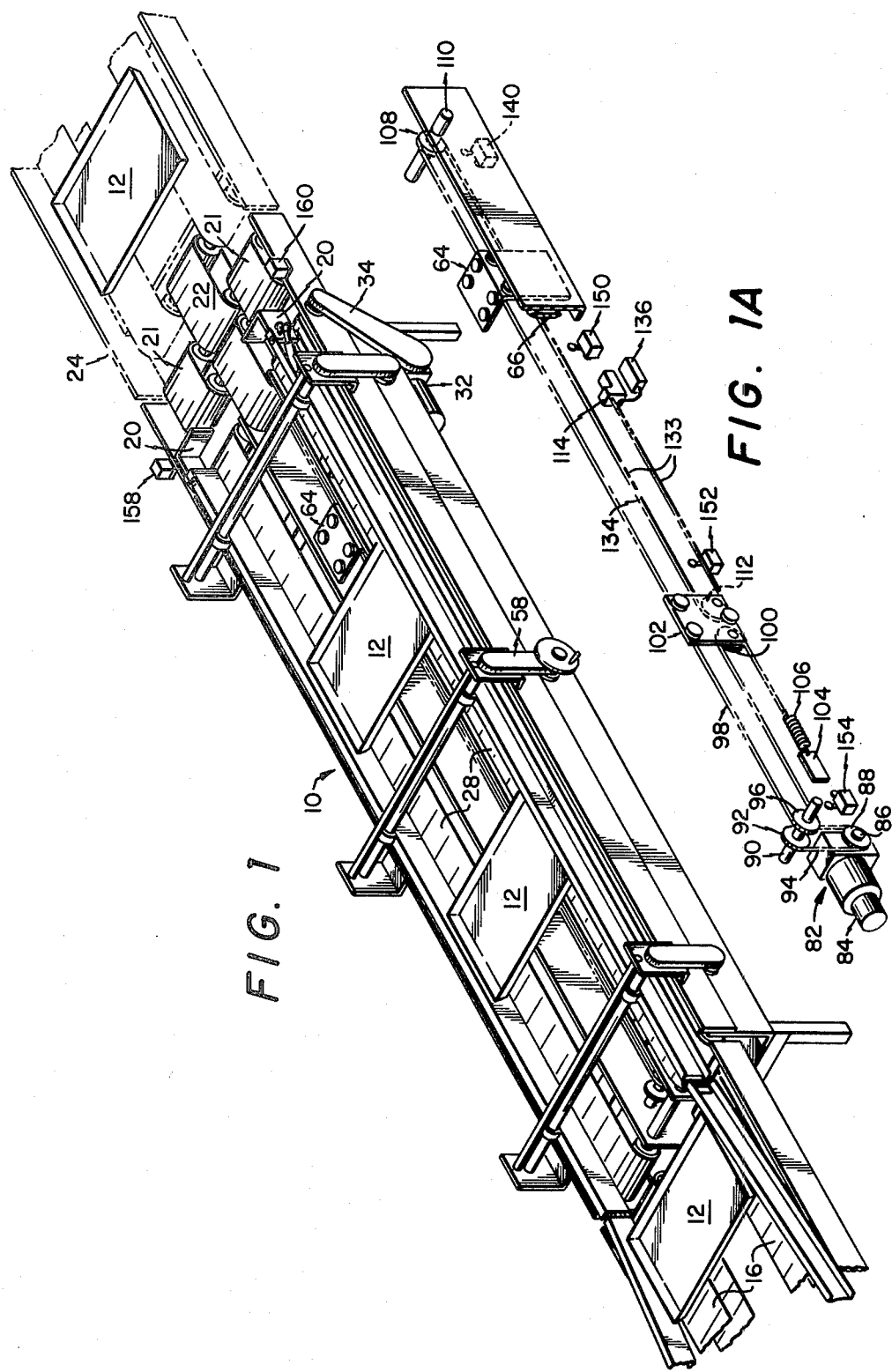

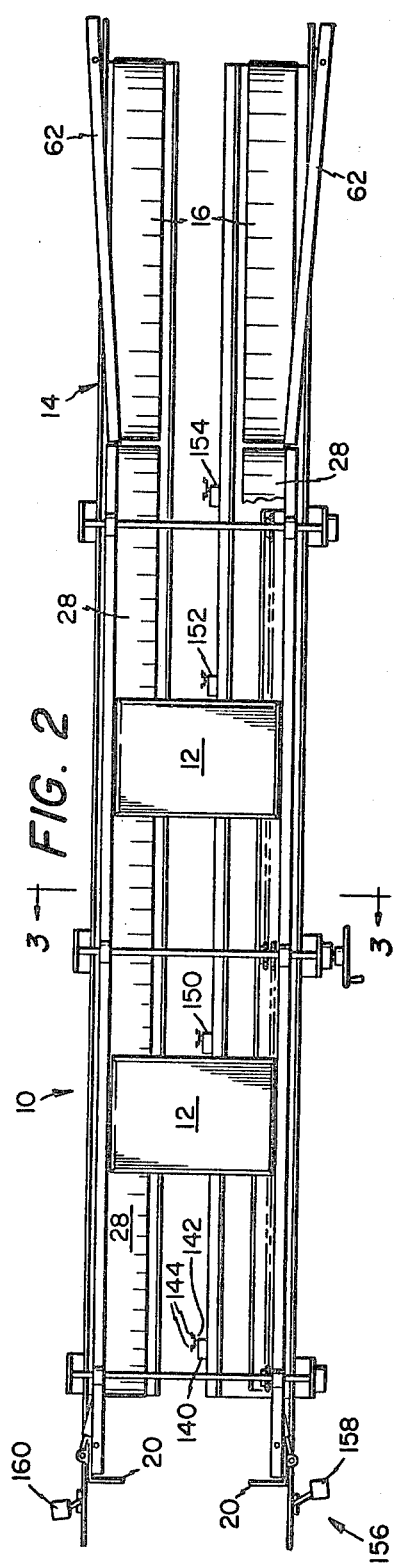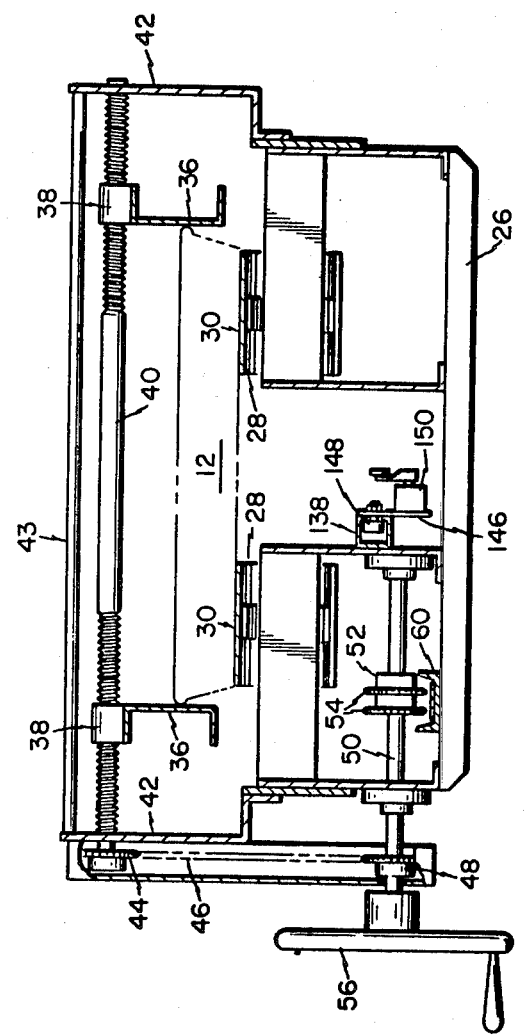

SENSOR TRAVERSING DEVICE

TECHNICAL FIELD

This invention relates to the grouping of a number of objects, and in particular grouping objects sensitive to shock.

BACKGROUND ART

In the operation of a modern bakery, dough is placed in pans adapted for transporting the dough along a conveyor system. A quantity of dough is placed in each pan and is then conveyed to a proof box. The dough rises within the proof box until the desired consistency is provided. When the dough has risen, the pans are transported to an oven for baking.

During the transfer of the risen dough from the proof box to the oven, the dough is unstable and can be ruined if subjected to excessive mechanical shock. In most baking operations, pans containing the risen dough are grouped prior to entering the oven. It is therefore necessary that each pan come into contact either with a barrier or with another pan in order to assemble the group of pans prior to entry into the oven.

It has been found that contact between a pan containing conventional risen dough with another object at a combined velocity in excess of 68 feet per minute will cause the dough to fall. An industry-wide maximum pan conveying speed of 60 feet per minute has therefore been adopted which assures that no pan will be subjected to shock sufficient to cause the dough to fall.

However, recently so-called tender doughs have been employed in baking operations. Experience has taught that tender dough will not survive contact with an object at a combined velocity in excess of about 30 feet per minute. It will be understood that since existing bakeries are designed to operate at the prior standard conveyor velocity of 60 feet per minute, reducing the converging speed between the proof box and the oven to a velocity of 30 feet per minute disrupts the entire baking operation.

Therefore, a need has been shown to develop an apparatus and method for transferring risen dough between a proof box and oven at the industry standard of 60 feet per minute while assuring that no pan containing risen dough will contact another object at a combined speed in excess of 30 feet per minute.

SUMMARY OF THE INVENTION

In accordance with one aspect of the present invention, a grouping system for grouping objects is provided. The grouping system includes a frame and a conveyor supported on the frame for moving the objects in a first direction. Drive structure is provided for operating the conveyor to move the objects in the first direction at a first relatively fast speed and at a second relatively slow speed. A barrier is mounted on the frame and moveable between extended and retracted positions. The barrier in the extended postion contacts an object on the conveyor to stop the motion of the object in the first direction. Each following object is in turn stopped as it contacts the preceding stopped object. A group end sensor is mounted on the frame for movement along the conveyor. The group end sensor includes forward sensors for sensing the presence of an object at a first position and rearward sensors behind the forward sensors structure for sensing the presence of an object at a second position separated a predetermined distance behind the first position. Control structure is provided for operating the conveyor at the first speed until the rearward sensors sense the presence of an object. The control structure then reduces the conveyor to the second, slower speed so that the object contacts the barrier at the relatively slow speed. The control structure next moves the group end sensor rearwardly until both the forward and rearward sensors are clear and then moves the group end sensor in the first direction with the conveyor at the slow speed until the forward sensors detect the stopped object. At this point the group end sensor is stopped and the conveyor is operated to move the objects at the first, faster speed. Upon sensing by the rearward sensor structure of another object, the control structure again reduces the conveyor speed to the slow speed so that the object contacts the preceding stopped object at the second, slow speed.

In accordance with another aspect of the present invention, a bakery pan grouping system is provided. The system includes structure for conveying bakery pans serially along a predetermined path at a predetermined speed. Structure is provided for temporarily interrupting the movement of the pans at a predetermined point on the path and thereby accumulating a group of pans. Structure is provided for sensing the location of the trailing edge of the last pan in the accumulating group. Structure is provided for sensing the leading edge of each incoming pan. Structure is provided responsive to the positioning of the leading edge of each incoming pan at a predetermined distance from the positioning of the trailing edge of the last pan in the accumulating group to substantially reduce the speed of travel of the incoming pan.

In accordance with yet another aspect of the present invention, a method is provided for handling bakery pans containing raised dough. The method includes the steps of conveying individual bakery pans, each having raised dough therein, from a proofing zone toward an oven for baking. The conveying step is carried out at a predetermined speed with the pans arranged in a spaced-apart relationship. The method further includes the step of intermittently positioning a barrier in the predetermined path between the proofing zone and the oven so that a first pan engages the barrier and is thereby prevented from movement along the predetermined path and following pans each engage the preceding stopped pan and thereby accumulating a group of pans. The method includes the step of substantially reducing the conveying speed of each pan prior to engagement thereof with either the barrier or a previously stopped pan to thereby prevent damage to the raised dough in the pans. The method concludes with the step of removing the barrier from a predetermined path and thereby releasing a group of pans for movement along the predetermined path into the oven.

BRIEF DESCRIPTION OF THE DRAWINGS

A more complete understanding of the invention may be had by reference to the following Detailed Description when taken in conjunction with the accompanying drawings, where:

FIG. 1 is a perspective view of a grouping system forming one embodiment of the present invention;

FIG. 1A is a perspective view of the group end sensor drive system used in the grouping system of FIG. 1.

FIG. 2 is a top view of the grouping system illustrated in FIG. 1;

FIG. 3 is a vertical cross-sectional view of the grouping system taken along line 3—3 in FIG. 2 in the direction of the arrows;

DETAILED DESCRIPTION

Figure 4:
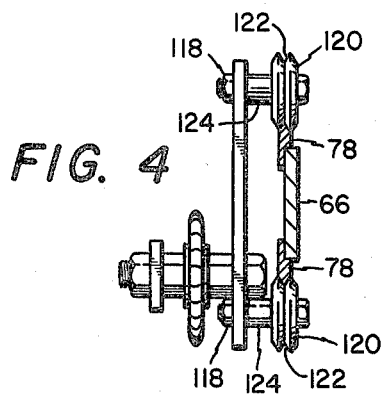
FIG. 4 is an end view of a sprocket carriage assembly employed in the grouping system.

Referring now to the drawings, wherein like reference characters represent like or corresponding parts throughout several views, FIG. 1 illustrates a grouping system 10 forming one embodiment of the present invention. The system is incorporated within an automated system for baking bread and similar bakery products.

Dough is mixed during a process upstream of the grouper system and entered into open top pans 12. The pans 12 enter a proofing box which permits the dough to rise. Unloader system 14 is employed to unload the pans from the proofing box toward the grouping system 10. The unloader system includes parallel conveyors 16 driven to propel the pans along the conveyor 16 toward grouping system 10. In the preferred embodiment, the conveyor 16 moves the pans at a speed of 60 feet per minute.

Figure 10:
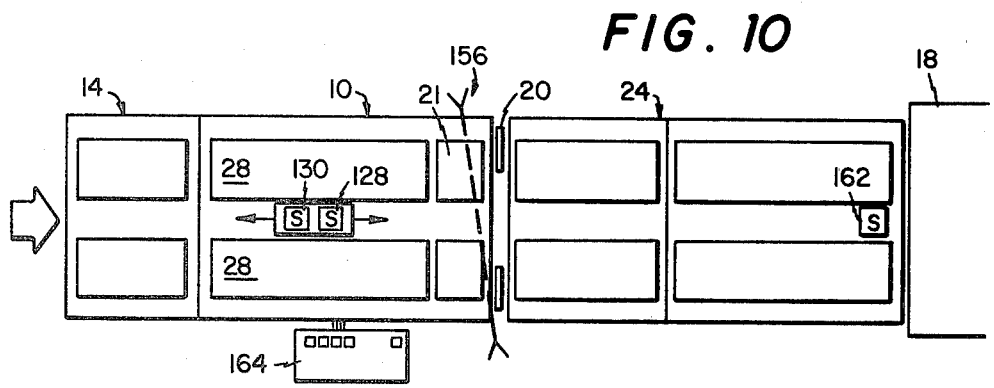
FIG. 10 is a schematic view of the grouping system cooperating with a pan unloader, oven-ready conveyor and oven.

The grouping system 10 receives pans from the unloader system 14 and forms a group of pans of a predetermined number for batch entry into the oven 18 shown in FIG. 10. The grouping system 10 groups the pans at a speed approaching that of the unloader system conveyor while ensuring that the pans entering the grouping system do not contact any object at a combined speed greater than that permitted to ensure that the risen dough will not fall. The group is formed against a barrier formed by pivoting gates 20.

When the gates 20 are open, the group or partial group of pans are driven over pan accelerator belts 21 and conveyor interlaces 22 onto an oven ready conveyor 24. The oven ready conveyor 24 is used to drive the group of pans into the oven 18. If the oven is not ready, the conveyor 24 will stop and hold the group of pans. If the oven is ready, the pans will be transported directly from system 10, onto conveyor 24 and into the oven.

The construction of the grouping system 10 is shown in greater detail in FIGS. 2 and 3. The grouping system 10 includes a base 26 which supports twin parallel conveyor belts 28. The belts 28 are continuous with the upper reach 30 of each belt supporting and transporting the pans 12 along the grouping system.

The belts 28 are driven by a motor 32 through drive chains 34. The motor drives the conveyors at at least two speeds. In the preferred construction, the motor is a DC operated motor capable of driving the conveyors at any speed between stoppage and the desired maximum limit.

The gates 20 are pivotally mounted to guide 36 at the forward end of the conveyor belts 28. Double acting cylinders 23 are employed to pivot the gates between the extended positions shown in solid line in FIG. 2 and the retracted positions shown in phantom line. In the extended positions, the cylinders 23 hold the gates 20 in the path of pans 12 moving on conveyor belts 28 to stop the motion of the pans. With the gates 20 in the retracted positions, the pans are free to travel onto the oven-ready conveyor 24.

Pan accelerator belts 21 are also driven by a motor (not shown) to move the pans at a fixed speed. The speed of belts 21 is always faster than the speed of belts 28. The interlaces 22 are driven from conveyors 28 and conveyor 24.

The pans 12 are guided along the grouping system by parallel pan guides 36. The separation between the pan guides is adjustable to adapt the system for a range of pan sizes. The pan guides are secured to guide nuts 38. The guide nuts are threadedly received on reverse threaded portions of rotatable guide screws 40. The guide screws 40, in turn, are rotatably supported at both ends in brackets 42 extending upwardly from the base 26. The brackets 42 are interconnected by rigid guide rods 43 to provide further support.

At one end of each guide screw 40 is secured to a sprocket 44. A chain 46 is extended about each of the sprockets 44 and an intermediate sprocket 48 beneath each sprocket 44. Each intermediate sprocket is mounted on a drive shaft 50 rotatably secured to the base 26. Sprockets 52 are also mounted on the drive shafts for interconnecting the drive shafts through chains 54. One of the drive shafts extends outwardly from the intermediate sprocket 48 to mount a hand wheel 56. Rotation of the hand wheel 56 will move the pan guides 36 together or apart through the cooperating chains and sprockets, the guide screws 40 and the guide nuts 38.

Chain guards 58 are mounted on the system about the sprockets 44 and 48 and chains 46 for safety. A track assembly 60 is provided to support the chains 54 interconnecting sprockets 52. The unloader system 14 also has adjustable guides 62 which converge in the direction of travel of the pans to center the pans prior to entry in the grouping system 10.

Figure 6:
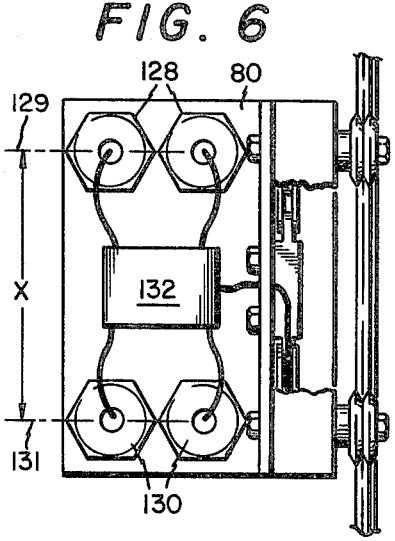
FIG. 6 is a bottom view of a group end sensor employed in the grouping system for sensing the presence of bakery pans.
Figure 7:
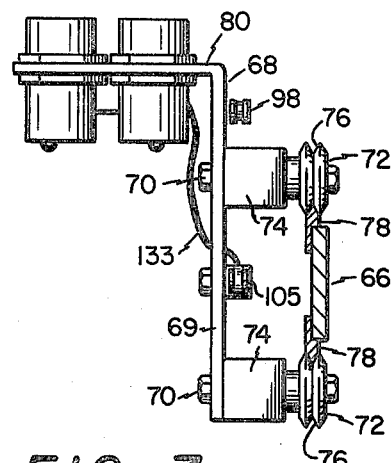
FIG. 7 is an end view of the group end sensor.

The grouping system 10 includes a group end sensor 64 which is moveable along the entire length of the grouping system between the parallel conveyor belts 28. A carriage track 66 is secured along the length of the grouping system 10 for supporting the group end sensor 64. As illustrated in FIGS. 6 and 7, the sensor 64 includes a bracket 68 having a vertically disposed portion 69 supporting four extensions 70. Guide wheels 72 rotate on extensions 70 and are separated from the bracket by spacers 74. Each wheel 72 includes a V-notch 76 about its outer periphery for receiving an edge 78 of the track 66. A pair of guide wheels run on each of the edges of the track 66 to permit the sensor 64 to move horizontally along the track along the entire length of the grouping system 10. The wheels maintain the horizontal portion 80 of the bracket 68 parallel to the bottoms of the pans 12 as it traverses along the track 66.

The group end sensor 64 is moved through a drive assembly 82 shown in FIGURE 1A. The drive assembly includes a motor 84 which drives an output shaft 86. The motor 84 drives the group end sensor 64 at at least two speeds corresponding to the speeds provided for the parallel conveyor belts 28. In the preferred construction, the motor 84 is a continuously variable speed DC motor.

The output shaft 86 of the gear motor 84 mounts a sprocket 88. A shaft 90 is mounted to the base 26 for rotation about an axis parallel the axis of rotation of the drive shaft 86. The shaft 90 mounts a sprocket 92 in a common plane with the sprocket 88 and chain 94 is constrained about the sprockets 88 and 92 for common rotation.

A second sprocket 96 is also mounted on shaft 90 spaced from sprocket 92. A drive chain 98 is constrained about the sprocket 96. One end of the drive chain 98 extends about an idler sprocket 100 mounted on take-up carriage 102 and is secured to an anchor 104 through a tension spring 106. The opposite end of the drive chain extends along the length of track 66 and passes about an idler sprocket 108 rotatably mounted on a fixed shaft 110 at the end of the grouping system opposite the motor 84. The chain is secured to the group end sensor by clamp 105, passes about a second idler sprocket 112 on the take-up carriage 102 and is fixed to an anchor 114.

Figure 5:
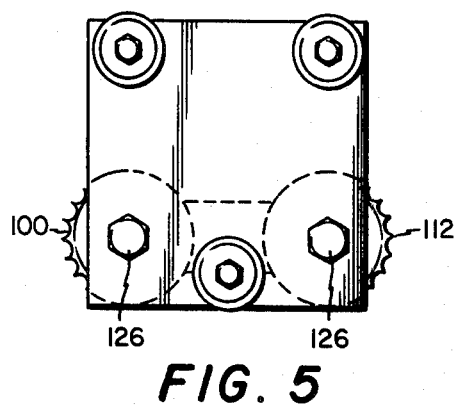
FIG. 5 is a side view of the sprocket carriage assembly.

Details of the take-up carriage 102 are best illustrated in FIGS. 4 and 5. The take-up carriage includes a plate 116 mounting three extensions 118. The extensions are similar to extension 70 and rotatably mount guide wheels 120. The guide wheels contain V-shaped notches 122 for receiving the edges 78 of the guide 66. Guide wheel spacers 124 separate the guide wheels 122 from the plate. As can be seen in FIG. 4, the take-up carriage 102 is supported on the track 66 by the guide wheels for movement along the length of the track behind the group end sensor 64. Two extensions 126 are provided on the opposite side of the plate from the track rotatably mounting the first and second idler sprockets 100 and 112.

Rotation of the shaft 90 and sprockets 88 and 92 by the motor 84 will traverse the group end sensor 64 and take-up carriage 102 in either direction along the grouping system 10. The provision of the take-up carriage 102 permits the group end sensor to be moved anywhere between the sprocket 108 and as close to sprocket 96 as the width of carriage 102. The take-up carriage will travel one-half the distance at one-half the speed of the group end sensor through the provision of the parallel extensions of the drive chain 98 between the sprockets 96 and 100. The take-up carriage 102 will always move in the same direction as the group end sensor 64.

The tensioning spring 106 maintains the tension in the drive chain at a sufficient level to retain the chain about the sprockets.

Dual forward sensors 128 are mounted on the horizontal section 80 of the group end sensor 64. The forward sensors 128 sense the presence of a pan 12 directly above the sensors at a first position 129. Dual sensors are employed to assure reliable sensing of irregular pan bottoms.

Dual rearward sensors 130 are mounted on the section 80 behind the forward sensors. Again, dual sensors are provided to assure reliable sensing. The rearward sensors also sense the presence of a pan directly above the sensors at a second position 131 a predetermined distance X behind position 129. In the preferred construction, both forward and rearward sensors 128 and 130 are ferromagnetically activatable for sensing iron pans 12 and are connected in parallel.

Signal leads from the sensors 128 and 130 extend into a junction box 132 mounted on the section 80. A cable 133 extending from the junction box is secured along the section 134 of the drive chain 98 to a connection box 136 rigidly mounted on the base 26. A significant advantage of the drive assembly 82, made possible by carriage assembly 102, is the ability to move the group end sensor 64 along the system 10 while maintaining a fixed length cable 133 which is secured to box 136.

A track 138 extends the length of the grouping system 10 proximate the group end sensor 64. A series of limit switches are distributed along the length of the track. Full forward limit switch 140 is mounted near the forward end of the grouping system as best seen in FIGS. 1 and 2. The limit switch 140 includes a pivoting activator 142 having two perpendicularly extending arms ending in roller cams 144. The limit switch 140 is mounted on a limit switch bracket 146. The bracket 146, in turn, is secured to an adjusting bracket 148 for adjusting the limit switch along the track 138. The switch 140 is a two position switch which is activated by contact with the group end sensor 64 as it traverses the location of the switch. As the group end sensor 64 moves forward in the grouping system, the sensor will trip the switch through one of the roller cams 144 from a first position to a second position. When the group end sensor 64 moves rearward, it will trip the other cam 144 and move the switch back to the first position. The switch 140 is adjusted to be activated by the group end sensor when the sensor is at its full forward limit near gates 20.

A full group limit switch 150, a full conveyor limit switch 152 and a full rearward limit switch 154 are each positioned along the grouping system 10 rearward of the switch 140. Each of the switches is substantially identical in operation to the switch 140 and will therefore not be described further. Each of the switches is designed for activation by the group end sensor 64 during a portion of its travel.

In addition to the limit switches provided on the grouping system 10, several other sensing mechanisms are employed. A pan counter 156 is employed to count individual pans passing the gates 20 and moved onto the oven-ready conveyor 24 as seen in FIGS. 2 and 10. The pan counter comprises a photoelectric transmitter 158 and a receiver 160 positioned on opposite sides of the path of the pans so that passage of the pans interrupts the light travel from the transmitter to receiver.

The pan counter 156 is positioned so that the light from the source is blocked from the receiver by the leading edge of a pan 12. The counter 156 can also then be used to detect the approach of a pan with a sufficient warning to close the gates and reduce the speed of belts 28 to prevent injury to the dough in the pan.

A ready position sensor 162 is positioned on the oven-ready conveyor 24 as seen in FIG. 10. The sensor 162 is activated by the proximity of a pan over its location on the conveyor.

Figure 8A:
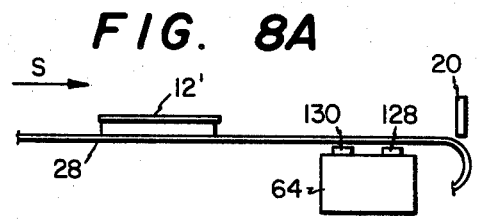
FIGS. 8A-D are schemtic illustrations of the operation of the grouping system in forming a group of pans against a barrier.

A control panel 164 is provided near the grouping system 10 which provides control of operation of the system. The sequence and logic of the operation is best illustrated in FIGS. 8 through 10. Initially, no pans 12 are conveyed by the grouping system 10 and the gates 20 are closed. With reference to FIG. 9A illustrating the finder loop 165 of the operational logic of the system, the group end sensor moves forward until stopped by tripping the full forward limit switch 140 when no pan is sensed by either forward or rearward sensors 128 and 130. Block 166 represents the determination of the group end sensor position by switch 140. If the group end sensor is not in the full forward position, the system directs motor 84 to move the group end sensor toward its forward limit as shown in block 168. As long as the forward sensors 128 are not blocked by the presence of a pan, the system operates in a continuous loop driving the group end sensor to its forward limit as seen in block 170.

When the group end sensor 64 reaches its full forward position, a determination is made whether the rearward sensors 128 are blocked as shown in block 172. With no pan present on the conveyor belts 28, the rearward sensors will not be blocked and the system 174 sets the speeds of conveyor belts 28 and accelerator belts 21 at the fast speed S as shown in block 174. Block 174 also dictates that the group end sensor 64 hold its current position until pans 12 arrive from the unloader system 14.

As pans are unloaded from the proofer, they will travel along the unloader system 14 at speed S. The first pan 12 unloaded will eventually travel onto the conveyor belts 28 which are also moving the pan at speed S as illustrated in FIG. 8A. As a first pan 12' approaches the gates 20, the rearward sensors 130 will sense the presence of the pan 12' approaching the gates. Block 172 will change to a yes logic answer, reducing the speed of conveyor belts 28 and belts 22 to a speed less than S as shown by block 176. For convenience of discussion, the reduced speed will be assumed to be 0.5 S. The speed of belts 28 and conveyor interlace 22 are inhibited to 0.5 S so that the impact of the first pan 12' against the closed gates 20 is below the critical speed which would cause the risen dough within the pan 12' to fall.

Figure 8B:
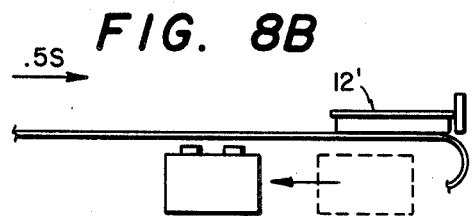
Figure 9A:
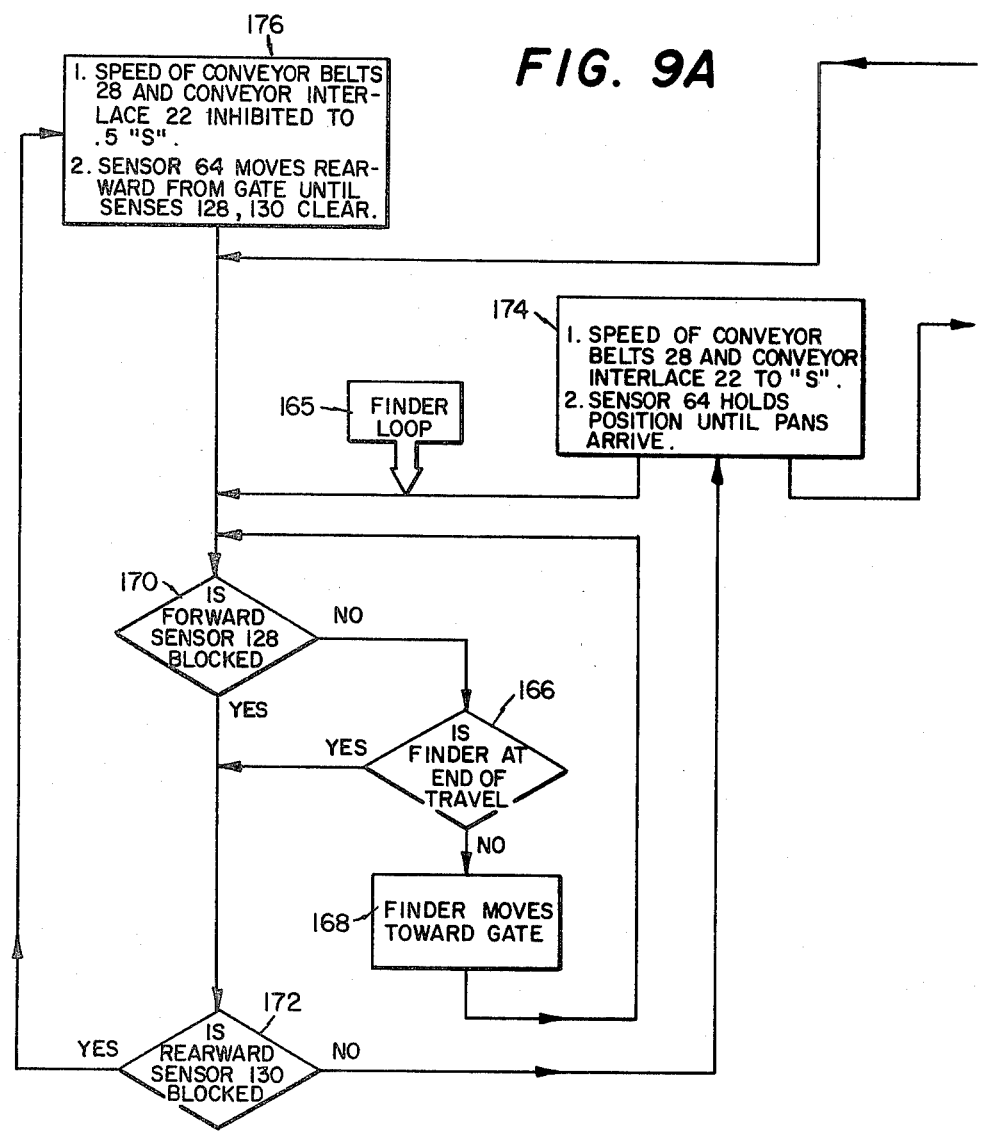
FIGS. 9A and 9B are flow chart diagrams of the finder loop and grouper loop in the grouping system.

The group end sensor 64 is then moved rearwardly away from gates 20 until the sensors 128 and 130 are clear, as illustrated in FIG. 8B and shown in block 176.

Figure 8C:
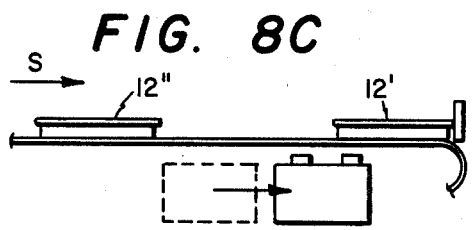
Figure 8D:
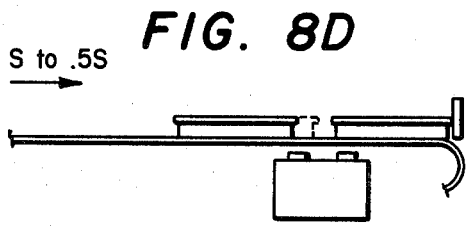

The group end sensor 64 moves rearwardly at high speed. When the sensors are clear, blocks 166–172 reverse the group end sensor motion and the sensor will move forward at a slow speed corresponding to the speed of the conveyor belts 28 and belts 22 of 0.5 S until the forward sensors 128 sense the first pan 12' which is maintained stationary against the gates 20. When this condition is achieved, block 174 shows that the system will again speed the conveyor belts 28 and belts 22 to full speed S as illustrated in FIG. 8C. The second pan 12'' from the proofer illustrated in FIG. 8C is conveyed along the unloader system and grouping system at the speed S while the group end sensor holds with the forward sensors sensing the first pan 12'. When the second pan 12'' activates the rearward sensors 130, block 172 leads to block 176 to slow the conveyor belts 28 and belts 22 to 0.5 S. The distance X between the positions of the pans sensed by the forward and rearward sensors is selected so that the pan 12'' may reduce its speed to 0.5 S before contacting the first pan. The dough in the second pan is thus also protected from falling due to excessive impact speed.

The grouping system continues the collection of the trays 12 against the gates 20 with the speed of each incoming pan being reduced prior to impact. As more and more pans are collected, the group end sensor 64 moves backward in the system 10. The full group limit switch 150 is positioned so that the switch is activated by the group end sensor 64 when a preselected size of group of pans has been collected. The full conveyor limit switch 152 is positioned for activation by the group end sensor 64 when the conveyor belts 28 and system 10 are filled to capacity. This switch causes the unloader system 14 to stop the output of pans from the proofer box until the conveyor 28 is cleared sufficiently for the group end sensor to move forward of the limit switch 152. The full back limit switch 154 stops further backward motion of the group end sensor 64, indicating the limit of its backward travel. If the full back limit switch 154 is activated, the unloader system 14 stops delivery of pans.

The oven 18 functions in batch operation. The oven accepts a given number of pans and bakes the bread over a predetermined time interval. The requirements for entry of pans 12 into the oven is therefore determined by the oven operation. The grouping system 10 may be operated in two modes, either group mode or random mode. In a random mode, the gates 20 remain open for a predetermined time interval to permit pans to go directly from the grouping system to the oven-ready conveyor 24 and into the oven. The pan counter 156 counts the pans passing through the gates. If the total number of pans passing the gates does not exceed the capacity of the oven during the time interval, the oven will be operated with whatever number of pans has been delivered during that time. If the pan counter 156 counts sufficient pans to form a group to fill the oven during the time interval, the gates will automatically shut when counter 156 senses the approach of the first pan following the group to prevent an excess number of pans from entering the oven. If a full group is not moved into the oven during the time interval, the gates will shut upon counter 156 sensing the approach of the first pan to gates 20 after ellapse of the time interval.

In the group mode, the grouping system 10 will collect pans until the full group limit switch 150 is activated by the backward movement of the group end sensor 64. This indicates that a group of pans, representing the capacity of the oven, has been grouped by system 10. The full group will then be transferred into the oven when the signal is given.

Figure 9B:
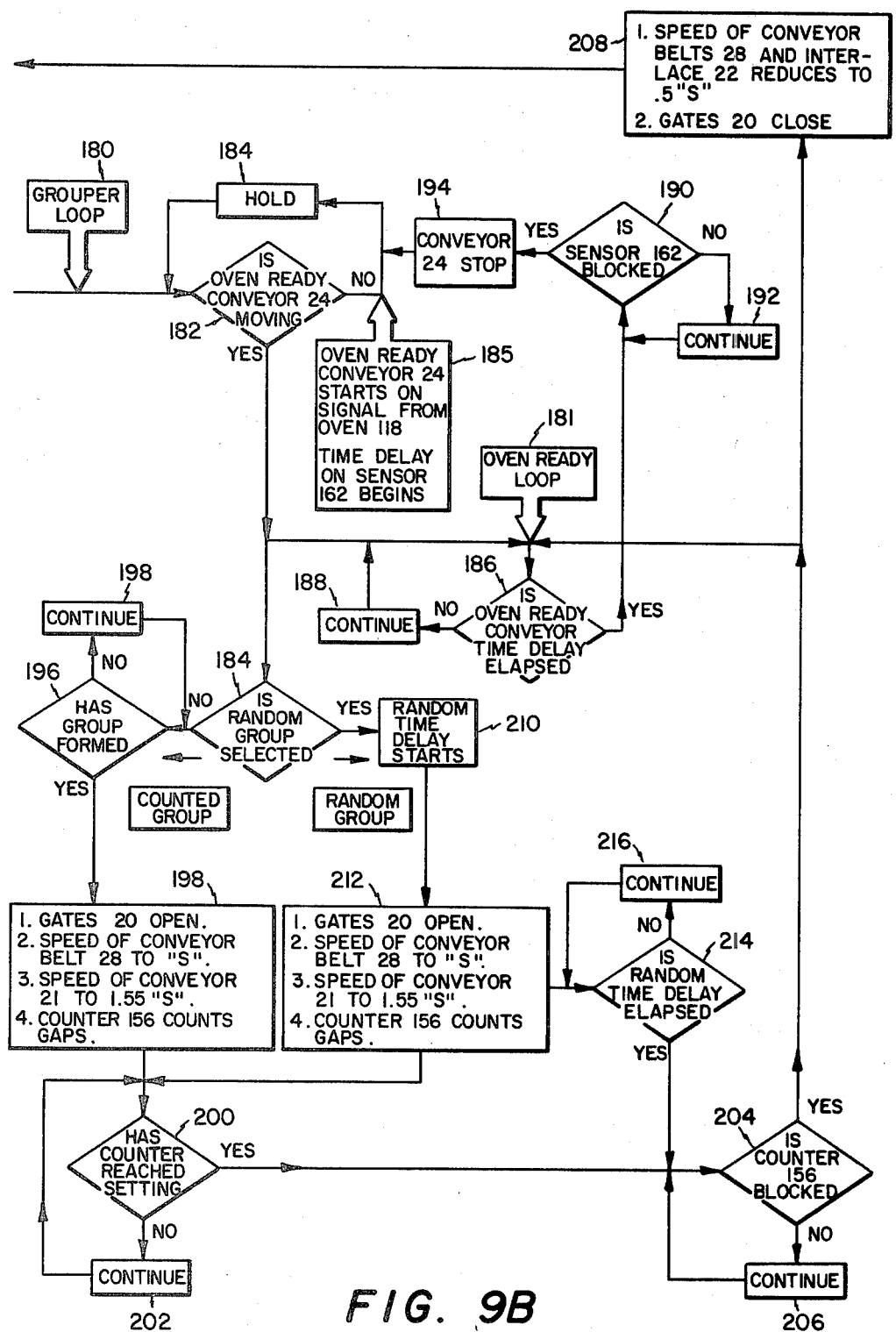

The transfer of pans from the grouping system 10 to oven is best described with reference to FIG. 9B showing the grouper loop 180. The oven-ready conveyor 24 operates is response to a signal from oven 18 represented by oven-ready loop 181. The oven will signal the conveyor 24 to begin running to supply a group of pans on the conveyor 24 to the oven at speed S. The gates 20 will open only when the oven conveyor 24 is moving as represented by block 182 in the grouper loop 180. If the conveyor 24 is not moving, the gates will hold represented by block 184 until conveyor 24 is moving.

When the oven-ready conveyor 24 begins movement in response to the oven 18, a timing choice associated with sensor 162 begins timing an interval sufficient to deliver a group of pans already on the conveyor 24 to the oven as shown in sequences 186 and 188. The sensor 162 is deactivated during this time interval. When the time interval has ellapsed, the group already on the conveyor 24 has past sensor 162 and the sensor is again activated. The conveyor 24 continues to run until sensor 162 senses the presence of a pan 12 transferred from the grouping system 10 as seen in blocks 190 and 192. The sensor 162 is positioned such that, when blocked by the first pan of a new group, the whole prior group has moved onto the conveyor 24 and the conveyor is then stopped to await another oven call as illustrated by block 194.

Block 184 represents the opening of the gates 20 to permit pans to pass on to the conveyor 24. The choice of mode, either random numbers of pans or a preselected number in a group determines the next sequence. If a group mode is selected, it first must be determined if a group has been formed on the grouping system 10. This step is represented by sequence 196. If a group has not yet been formed on the assembly 10, the gates 20 will remain closed until a group has been formed as represented by sequence 198.

When a group has formed on assembly 10, several events occur as represented by block 198. Gates 20 open to permit the pans to move onto the oven-ready conveyor 24. The pans 12 on conveyor belts 28 are moved at speed S. The pans are accelerated on belts 21 to a speed in excess of S. The accelerator belts 21 are run at a speed exceeding S so that when each pan travels from belt 28 onto the belts 21, they will be accelerated forward a predetermined distance from the following pans to provide a gap between the pans on the oven-ready conveyor 24. The speed of the accelerator belts 21 relative to the conveyor belts 28 determines the extent of the separation between the pans. In the embodiment described, the belts 21 move the pans at 1.55 S. Finally, the pan counter 156 counts the pans passing through the gates.

The grouping system 10 provides pans to the oven-ready conveyor 24 until the number of pans passing onto the conveyor 24 equal the group number. This is represented by blocks 200 and 202. If the counter has counted the number of pans forming a group, the conveyor belts 28 and belts 21 will continue operation until the counter 156 senses the presence of a pan following the last pan in the group delivered to the oven-ready conveyor 24 moving proximate the gates 20. This is represented by block 204 and 206. When the counter 156 senses the presence of this pan, the conveyor belts 28 and belts 22 are reduced in speed to 0.5 S and the gates 20 closed as represented by block 208. This prevents the pan from contacting the gates at a velocity greater than 0.5 S to prevent the dough from falling. With the gates 20 closed the finder loop 165 will continue to operate to completely fill another group on the grouping system 10. In the meantime, a complete group of pans has entered the oven-ready conveyor 24 for subsequent movement into the oven for baking.

If a random mode has been selected, a timer measuring a random time delay begins with the movement of the oven-ready conveyor 24 as represented by block 210. With the timer started, several other events occur represented by block 212. The gates 20 open to permit whatever number of pans that have been collected in the grouping system 10 to move onto the oven-ready conveyor 24. The speed of conveyor belts 28 increase to S and the speed of the accelerator belts 21 moves to a speed of 1.55 S to create a gap between each pan transferred onto the oven-ready conveyor. The counter 156 also begins counting the pans passing through the gate by sensing the gaps between the pans.

The grouping system 10 will provide pans to the oven-ready conveyor during the entire random time delay unless the system 10 delivers a number of pans equal to the capacity of the oven prior to elapse of the random time delay. This is represented by blocks 214 and 216. If the random time delay elapses before a group of pans has passed through the gate, blocks 204, 206 and 208 then are operative as described hereinabove. If, prior to elapse of the random time delay, a full group of pans passes the gates, the operation represented by blocks 200 and 202 is activated which again invokes the events represented by blocks 204, 206 and 208 to block further pans from moving onto the conveyor 24 prior to elapse of the time delay. These logic blocks permit a number of pans, not exceeding a group, to be moved onto the oven-ready conveyor within a preselected time interval for baking in the oven. A pan sensor 208 on conveyor 24 rearward of sensor 162 can replace counter 156 in the random mode. The distance between sensors 162 and 208 is selected to indicate the movement of an entire group onto the conveyor 24.

A significant advantage of the present invention represented by the embodiment described hereinabove is the ability to retain conveying speed for pans 12 approaching the full speed S while permitting pan-to-pan or pan-to-gate contact to never be at a combined speed which would create a likelihood of dough falling in the pans due to excessive mechanical shock. While the embodiment described and illustrated is particularly adapted for use in the baking industry, it will be readily understood that the principles and operation of the grouping system 10 and related components can be adapted for use in conveying any particular objects desired.

Although only one embodiment of the invention has been illustrated in the accompanying drawings and described in the foregoing Detailed Description, it will be understood that the invention is not limited to the embodiments disclosed, but is capable of numerous rearrangements, modifications and substitutions of parts and elements without departing from the scope and spirit of the invention.

We claim:

1. An apparatus for traversing a device between first and second locations, comprising:
    track means for mounting the device for rolling motion between the first and second locations;
    a first end sprocket means mounted for rotation proximate the first location;
    a second end sprocket means mounted for rotation proximate the second location;
    drive means for rotating at least one of said first and second end sprocket means;
    a takeup carriage mounted on said track means on one side of the device for rolling motion therealong and having first and second idler sprocket means for rotation mounted thereon; and
    a flexible chain means for constrained movement about said first and second end sprocket means and about said first and second idler sprocket means so that operation of said drive means to rotate said end sprocket means induces motion in said chain means, said chain means being fixed at a first end, the length of said chain means from the first end being sequentially constrained about said first idler sprocket means, said first end sprocket means, said second end sprocket means, secured to the device and constrained about said second idler sprocket means, the end of said chain means opposite the first end also being fixed, rotation by said drive means of at least one end sprocket means traversing the device between the first and second locations with said takeup carriage traveling in the direction of movement of the device at a reduced speed.

2. The apparatus of claim 1 wherein the device contains electronic components having a cable extending therefrom, the cable being secured along a portion of said chain means extending from the device to proximate one of said fixed ends to protect the cable as the device is traversed between locations.

3. The apparatus of claim 1 further comprising spring means for tensioning said chain means about the sprocket means.

4. The apparatus of claim 1 wherein limit switch means for sensing the position of the device are secured along the path of motion of the device for sensing the presence of the device.

5. An apparatus for traversing a device between first and second locations, comprising:

a track for mounting the device for rolling motion between the first and second locations;

a first end sprocket mounted for rotation about an axis perpendicular to the direction of motion of the device and proximate the first location spaced from the path of motion of the device;

a second end sprocket mounted for rotation about an axis perpendicular to the path of motion of the device and proximate the second location spaced from the path of travel of the device;

drive means for reversible rotation of at least one of said first and second end sprockets;

a takeup carriage mounted on said track for rolling motion between the device and the first location, said takeup carriage having first and second idler sprockets rotatably mounted thereon for rotation about axes perpendicular the path of motion of the device;

a flexible chain fixed at a first end relative to the first and second locations, the chain being constrained sequentially about the first idler sprocket, first end sprocket, second end sprocket, secured to the device and constrained about the second idler sprocket from the first end, the end opposite the first end further being fixed relative to the first and second location; rotation of an end sprocket by said drive means traversing the device between the first and second locations with the takeup carriage moving in the same direction as the device at half the speed.

6. The apparatus of claim 5 wherein electronic components are mounted on the device as having a cable extending therefrom, said cable being secured along the portion of the chain extending from the device, about the second idler sprocket to proximate said opposite end to route the cable between the traversing device and a fixed position.

7. The apparatus of claim 5 further comprising tensioning means secured between one of the ends of the chain and a fixed position for tensioning the chain about the sprocket.

8. An apparatus for traversing a device having electronic components thereon with a cable extending therefrom between first and second locations on a frame, comprising:

a track secured on the frame for mounting the device for motion between the first and second locations;

a first end sprocket rotatably mounted on the frame for rotation about an axis perpendicular the path of motion of the device and spaced outside the path of motion proximate the first location;

a second end sprocket mounted for rotation on the frame about an axis perpendicular the path of motion of the device and located outside the path of motion proximate the second location;

drive means for reversibly rotating at least one of said first and second end sprockets;

a takeup carriage mounted on said track on one side of the device for motion therealong, said takeup carriage having first and second idler sprockets rotatably mounted thereon for rotation about axes perpendicular the path of motion of the device with the axes being aligned in the direction of motion of the device; and a flexible chain fixed at a first end proximate the first location, the chain extending from the first end for sequential restraint about the first idler sprocket, first end sprocket, second end sprocket, secured to the device and restrained about the second idler sprocket, said chain being fixed at its opposite end to the frame at a position at least half the distance between the first add second locations from the first location toward the second location, rotation of at least one of the end sprockets by said drive means traversing the device between the first and second locations with the takeup carriage moving in the same direction as the device at half the speed;

the cable being secured along the portion of the chain extending from the device about the second idler sprocket to proximate said opposite fixed end to route the cable from the traversing device to a fixed position on the frame with the length of the cable between the traversing device and the fixed position on the frame being constant.

9. The apparatus of claim 8 further comprising a spring positioned between the first end of the chain and the frame for tensioning the chain to restrain the chain about the sprockets.

* * * * *